United States Patent Office 3,280,121
Patented Oct. 18, 1966

3,280,121
AMINOALKYLSYDNONES AND A METHOD FOR MAKING THEM
Giuseppe Palazzo, Rome, Italy, assignor to Aziende Chimiche Riunite Angelini Francesco, Rome, Italy, a corporation of Italy
No Drawing. Filed Aug. 12, 1963, Ser. No. 301,670
Claims priority, application Italy, Jan. 25, 1963, 31,208/63
9 Claims. (Cl. 260—247.2)

The present invention relates to a series of aminoalkyl-sydnones of the general Formula I:

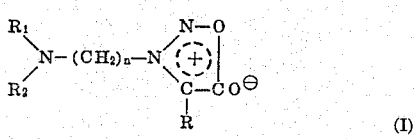

wherein R is selected from the group consisting of substituted or non-substituted aryl residues and substituted or non-substituted aralkyl residues, $n$ is an integer selected from the group consisting of 2 and 3; $R_1$ and $R_2$, which may be the same or different residues, represent lower alkyl residues or, together with N, form a five- or six-membered heterocyclic ring, which may be interrupted by other hetero atoms.

The invention also relates to a method for making aminoalkyl-sydnones of the general Formula I.

The compounds of the invention form a new, heretofore unknown series of sydnone derivatives, since no sydnones carrying actual amine groups have been known in the past, and exhibit interesting pharmacological properties, particularly antimycotic properties.

Their antimycotic activity may be evidenced by testing the biological liquids of animals treated with these substances against fungi cultures. So far, *Candida albicans, Aspergillus niger* and *Saccharomyces cerevisiae* have been examined. On the other hand, the products are inactive when brought into direct contact with the cultures. The conclusion may be drawn that the antimycotic activity is due to a metabolite released within the living organism. As far as the degree of antimycotic activity is concerned, it is remarkably greater than that shown by griseofulvin and mycostatin, taken as controls.

An antimycotic activity may also be noticed when testing the products by the corn germination test, in which case the products are found active at concentration levels lower than 0.03%.

The compounds of the general Formula I may be obtained, according to the invention, by a substantially known method, using an α-aryl- or α-aralkyl-aminoalkyl-glycine ester as the starting material. This ester is hydrolized with hydrochloric acid and converted into the corresponding amino acid dihydrochloride, which is then treated with sodium nitrite in the cold. The resulting N-nitroso compound is directly cyclized to the sydnone by the action of acetic anhydride. The synthesis may be represented by the following scheme:

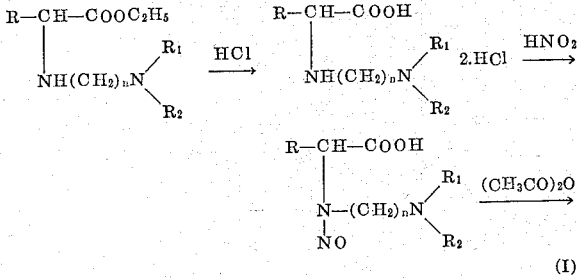

wherein $n$, R, $R_1$, and $R_2$ have the same meaning as indicated above. The sydnones of the general Formula I are partly oily, partly crystalline materials, which may be purified by any suitable method and may be characterized as their corresponding salts, preferably their hydrochlorides.

The following examples are illustrative of the method according to the invention, but are not to be construed as limitative thereof in any way.

EXAMPLE I

*N-β-dimethylaminoethyl-C-phenyl-sydnone*

0.32 mol of α-bromophenylacetic acid ethyl ester are incrementally added with stirring to a mixture of 0.47 mol of N,N-dimethyl-ethylenediamine, 0.32 mol of hydrated sodium acetate, and 60 ml. of absolute alcohol. A sizable amount of heat is evolved. The mixture is stirred for 2 hours, then heated to 100° C. for 30 minutes, and cooled. 120 ml. of 10% sodium carbonate are added, and the mixture is repeatedly extracted with ether. The ethereal layers are then extracted with diluted HCl, and the mixture is alkalified with 25% NaOH and solid $K_2CO_3$, extracted with ether, dried, and distilled. The α-phenyl-N(β-dimethylaminoethyl)glycine ethyl ester boils at 114–115° C./0.6 mm.

*Analysis.*—Calculated for $C_{14}H_{22}N_2O_2$: C, 67.17%; H, 8.86%; N, 11.19%. Found: C, 66.79%; H, 8.77%; N, 10.84%.

0.1 mol of this ester are heated to 100° C. for 1 hour with 110 ml. of conc. HCl. A colourless precipitate is recovered upon cooling, which is washed with acetone and dried. The substituted glycine dihydrochloride, M.P. 225° C. (dec.), is thus obtained. The yield is 90%.

*Analysis.*—Calculated for $C_{12}H_{20}Cl_2N_2O_2$: Cl, 24.02%. Found: Cl, 23.52%.

0.09 mol of sodium nitrite are slowly added to a solution of 0.081 mol of α-phenyl-N-β-dimethylaminoethyl-glycine dihydrochloride in 140 ml. of water, while cooling to 0° C. The mixture is kept standing overnight in a refrigerator, and the water is then removed under reduced pressure. The thick, yellow oil is treated with 80 ml. of acetic anhydride and kept standing in the dark at room temperature for 3 days. A solid separates, which is filtered, dissolved into water, and alkalified in the cold with 25% NaOH and solid $K_2CO_3$. The mixture is extracted with ethyl acetate, dried over sodium sulphate, the solvent is removed, and the oily residue is treated with anhydrous ether, and converted into the hydrochloride by adding ethereal HCl. Upon crystallization from alcohol, the sydnone, M.P. 215–16° C. (dec.), is obtained. The yield is 60%.

*Analysis.*—Calculated for $C_{12}H_{16}ClN_3O_2$: C, 53.43%; H, 5.98%; N, 15.58%; Cl, 13.14%. Found: C, 53.53%; H, 6.22%; N, 15.45%; Cl, 13.22%.

EXAMPLE 2

*N-β-diethylaminoethyl-C-p-methoxyphenyl-sydnone*

16.8 g. of N-diethylaminoethyl-α-p-methoxyphenyl-glycine ethyl ester and 50 ml. of concentrated HCl are heated to 100° C. for 1 hour. The acid is removed under reduced pressure, and the residue is washed with acetone and dried. 14 g. of the dihydrochloride, M. P. 201–2° C. (dec.), are obtained. 3 g. of sodium nitrite are portionwise added to a solution of 14 g. of the glycine hydrochloride in 50 ml. of water over a period of 20 minutes, while keeping the temperature at 0° C. and stirring. The mixture is kept standing overnight in a refrigerator, and the solvent is then removed under reduced pressure. The residue is treated with 44 ml. of acetic anhydride, and kept standing in the dark at room temperature for 3 days. The acetic anhydride is removed, and the residue is treated with a small volume of water and a few mls. of 1:1 HCl. The mixture is washed with ether, alkalified with 25% NaOH and extracted with ether. The residue is treated with alcoholic HCl and ethyl acetate. The sydnone hydrochloride is thus obtained which, upon crystallization from absolute alcohol, melts at 150–1° C. (dec.).

*Analysis.*—Calculated for $C_{15}H_{22}ClN_3O_3$: Cl, 10.82%; C, 54.96%; H, 6.77%. Found: Cl, 10.65%; C, 54.86%; H, 7.00%.

The following esters of aminoacids may be prepared by procedures similar to those described hereinbefore:

α-Phenyl-N-β-dimethylaminoethyl-glycine ethyl ester B.P. 114° C./0.6 mm.

α-Phenyl-N-β-diethylaminoethyl-glycine ethyl ester B.P. 145° C./1.5 mm.

α-Phenyl-N-β-morpholinoethyl-glycine ethyl ester B.P. 157° C./0.8 mm.

α - Phenyl - N - γ-dimethylaminopropyl-glycine ethyl ester B.P. 115° C./0.3 mm.

α - p - Methoxyphenyl - N-γ-dimethylaminopropyl glycine ethyl ester B.P. 125° C./0.1 mm.

β - Phenyl - N - γ-dimethylaminopropyl-alanine ethyl ester B.P. 125° C./0.3 mm.

The following aminoacid hydrochlorides may be prepared by procedures similar to those hereinbefore described:

α - Phenyl - N-β-dimethylaminoethyl-glycine dihydrochloride M.P. 225° C.

α - Phenyl-N-β-diethylaminoethyl-glycine dihydrochloride M.P. 238° C.

α - Phenyl - N-β-morpholinoethyl-glycine dihydrochloride M.P. 246° C.

α - Phenyl-N-γ-dimethylaminopropyl-glycine dihydrochloride M.P. 222° C.

α-p-Methoxyphenyl-N-γ-dimethylaminopropyl-glycine dihydrochloride M.P. 228° C.

The following sydnones of the general Formula I may also be prepared by procedures similar to those described hereinbefore:

N - β - diethylaminoethyl-C-phenyl-sydnone hydrochloride M.P. 155° C.

N-β-morpholinoethyl-C-phenyl-sydnone M.P. 98° C.

N - β - morpholinoethyl - C-phenyl-sydnone hydrochloride M.P. 194° C.

N - γ - dimethylaminopropyl-C-p-methoxyphenyl-sydnone hydrochloride M.P. 166° C.

N - γ - dimethylaminopropyl-C-benzyl-sydnone hydrochloride M.P. 175° C.

What I claim is:

1. An aminoalkylsydnone of the formula

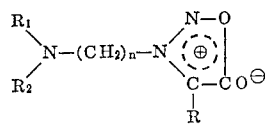

wherein R is a member selected from the group consisting of phenyl, p-methoxyphenyl and benzyl; n is an integer selected from the group consisting of 2 and 3; and $R_1$ and $R_2$ are each lower alkyl or, together with N, morpholino; or a non-toxic acid addition salt of said aminoalkylsydnone.

2. The compound of the formula:

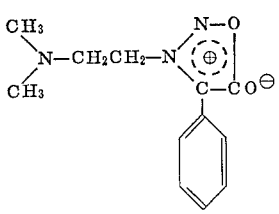

or a non-toxic acid addition salt thereof.

3. The compound of the formula:

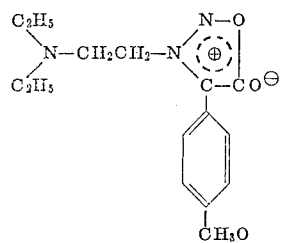

or a non-toxic acid addition salt thereof.

4. The compound of the formula:

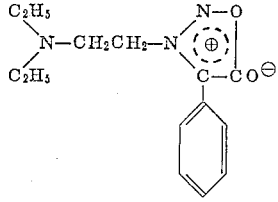

or a non-toxic acid addition salt thereof.

5. The compound of the formula:

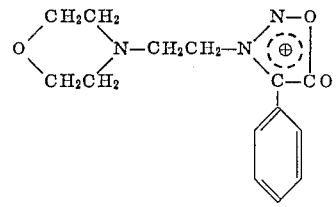

or a salt thereof.

6. The compound of the formula:

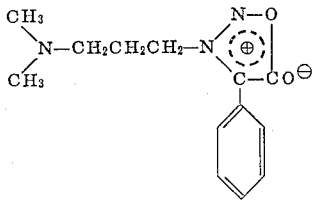

or a non-toxic acid addition salt thereof.

7. The compound of the formula:

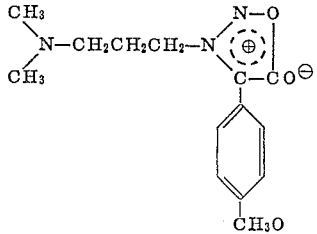

or a salt thereof.

8. The compound of the formula:

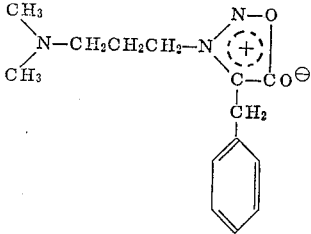

or a non-toxic acid addition salt thereof.

9. A process for making an aminoalkylsydnone according to claim 1 which comprises nitrosating a glycine of the formula

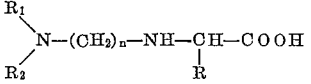

wherein $n$, R, $R_1$, $R_2$ have the same meaning as in claim 1, and treating the resulting N-nitroso compound with acetic anhydride.

References Cited by the Examiner

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,425,320 | 8/1947 | Hill | 252—149 |
| 2,502,453 | 4/1950 | Gresham et al. | 260—518 |
| 2,503,652 | 4/1950 | Baltzly et al. | 260—47 |
| 2,606,155 | 8/1952 | Hill | 252—149 |
| 2,623,046 | 12/1952 | Cusic | 260—247.2 |
| 2,908,688 | 10/1959 | Gardner et al. | 260—247.2 |
| 2,939,881 | 6/1960 | Wiegert | 260—519 |

ALEX MAZEL, *Primary Examiner.*

NICHOLAS S. RIZZO, HENRY R. JILES, *Examiners.*

J. TOVAR, *Assistant Examiner.*